United States Patent
Ayyapureddi (10) Patent No.: US 12,164,803 B2
(45) Date of Patent: Dec. 10, 2024

(54) MEMORY WITH MEMORY-INITIATED COMMAND INSERTION, AND ASSOCIATED SYSTEMS, DEVICES, AND METHODS

(71) Applicant: Micron Technology, Inc., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/327,530

(22) Filed: May 21, 2021

(65) Prior Publication Data

US 2022/0374168 A1    Nov. 24, 2022

(51) Int. Cl.
*G06F 3/06* (2006.01)
*G06F 13/16* (2006.01)

(52) U.S. Cl.
CPC .......... *G06F 3/0659* (2013.01); *G06F 3/0611* (2013.01); *G06F 3/0673* (2013.01); *G06F 13/1668* (2013.01)

(58) Field of Classification Search
CPC .... G06F 3/0659; G06F 3/0611; G06F 3/0673; G06F 13/1668; G11C 2211/40615
See application file for complete search history.

(56) References Cited

U.S. PATENT DOCUMENTS

| | | | |
|---|---|---|---|
| 8,818,867 B2 | 8/2014 | Baldwin et al. | |
| 9,740,269 B1 | 8/2017 | Tatapudi et al. | |
| 2008/0082751 A1* | 4/2008 | Okin | G06F 12/0246 |
| | | | 711/E12.001 |
| 2009/0210942 A1 | 8/2009 | Abel | |
| 2014/0089576 A1* | 3/2014 | Bains | G11C 11/40622 |
| | | | 711/E12.001 |
| 2016/0335200 A1* | 11/2016 | Cambou | G11C 11/4091 |
| 2017/0133085 A1* | 5/2017 | Kim | G11C 11/40611 |
| 2017/0255383 A1* | 9/2017 | Chang | G06F 3/0652 |

(Continued)

OTHER PUBLICATIONS

Everything (An article titled 'Everything You Always Wanted to Know About SDRAM (Memory): But Were Afraid to Ask' by Rajinder Gill, published Aug. 15, 2010.) (Year: 2010).*

(Continued)

*Primary Examiner* — Michael Krofcheck
*Assistant Examiner* — Janice M. Girouard
(74) *Attorney, Agent, or Firm* — Perkins Coie LLP (57) ABSTRACT

Memory devices and systems with memory-initiated command insertion (and associated methods) are disclosed herein. In one embodiment, a memory device comprises a command insertion terminal configured to be operably connected to a memory controller. The memory device can (i) identify a condition that can be addressed by receiving a command from the memory controller, and (ii) output, via the command insertion terminal, the command or an indication of the condition such that the command is inserted into a command queue of the memory controller. The memory device can include a command terminal over which the memory device can receive the command from the memory controller after the command is inserted in the command queue. In some embodiments, the condition can be a memory region of the memory device requiring a refresh cycle, and the command can be a command to perform a refresh cycle on the memory region.

17 Claims, 4 Drawing Sheets

(56) References Cited

U.S. PATENT DOCUMENTS

2017/0255398 A1\* 9/2017 Niu .................... G06F 3/0656
2018/0225230 A1  8/2018 Litichever et al.
2019/0220224 A1\* 7/2019 Lu ...................... G06F 3/061

OTHER PUBLICATIONS

A book titled "MEmory Systems: Cache, DRAM, Disk" by Bruce Jacob, et el. (Year: 2008).\*

U.S. Appl. No. 17/318,219—Unpublished Patent Application to Ayyapureddi, filed May 12, 2021, titled "Memory With a Communications Bus for Device-To-Controller Communication, and Associated Systems, Devices, and Methods," 39 pages.

\* cited by examiner

Figure 3:
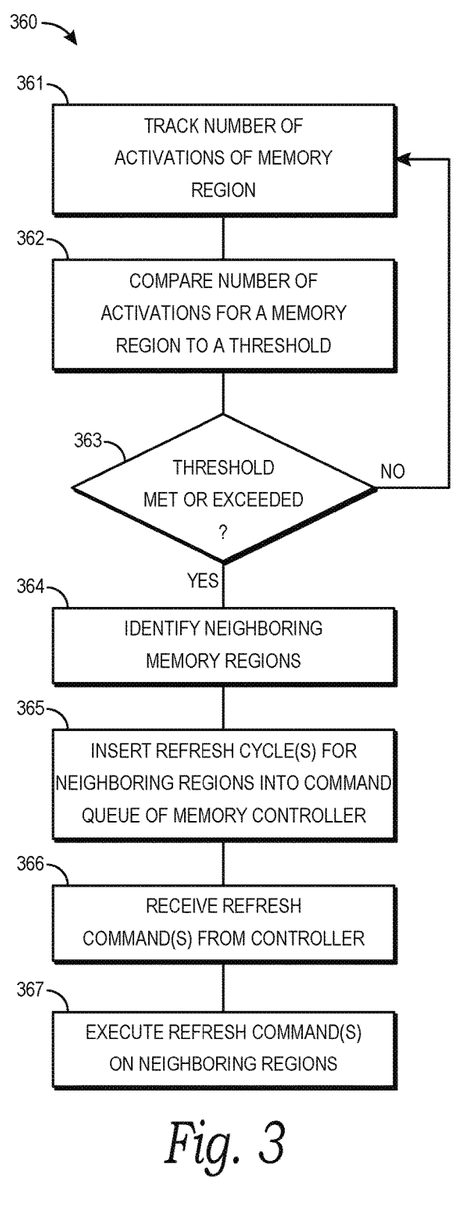
FIG. 3 is a flow diagram illustrating a routine for inserting refresh operations and/or cycles into a command queue of a memory controller in accordance with various embodiments of the present technology.
Figure 4:
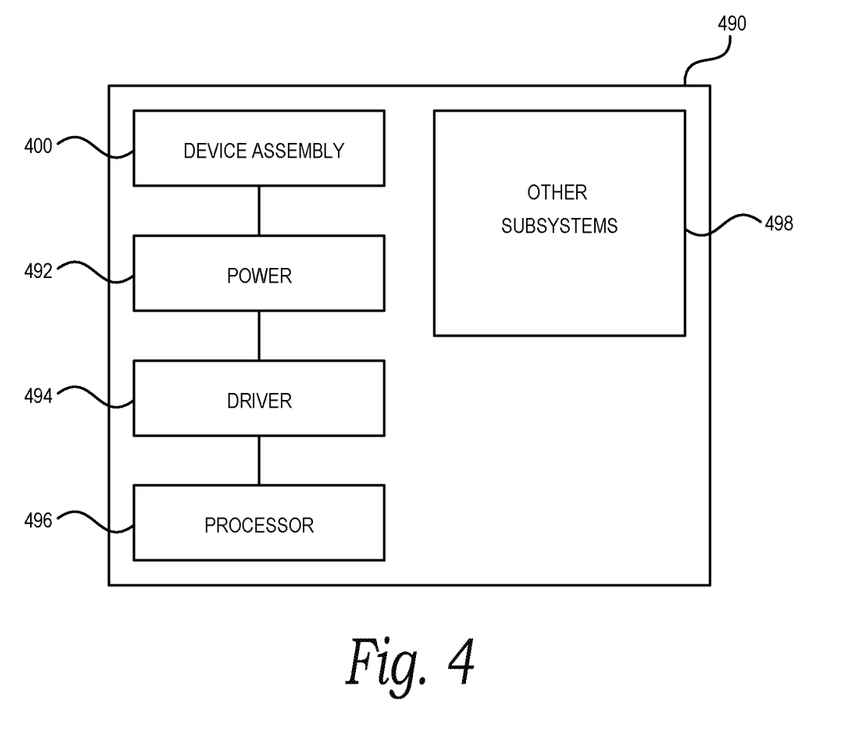
FIG. 4 is a schematic view of a system that includes a memory device or system configured in accordance with various embodiments of the present technology.

Fig. 4 ns, and associated systems, devices, and
methods. In some embodiments, a memory system includes
a command insertion signal trace operably connecting (e.g.,
a memory command scheduler of) a memory controller to a
command insertion terminal of a memory device. In operation, the memory device can (a) identify a condition that can
be addressed by a memory device receiving a command
from the memory controller, and/or (b) transmit the command to the memory controller (via the command insertion
terminal and the command insertion signal trace) for insertion into a command queue of the memory controller. In
turn, the memory controller can issue the command to one
or more memory devices of the memory system, such as
over a command/address and/or data bus operably connecting the memory controller to the one or more memory
devices. In response to receiving the command from the
memory controller, a memory device can proceed to execute
the command (e.g., to address the identified condition). A
person skilled in the art will understand that the technology
may have additional embodiments and that the technology
may be practiced without several of the details of the
embodiments described below with reference to FIGS.
1A-4.

In the illustrated embodiments below, the memory
devices and systems are primarily described in the context of
devices incorporating DRAM storage media. Memory
devices configured in accordance with other embodiments of
the present technology, however, can include other types of
memory devices and systems incorporating other types of
storage media, including PCM, SRAM, FRAM, RRAM,
MRAM, read only memory (ROM), erasable programmable
ROM (EPROM), electrically erasable programmable ROM
(EEROM), ferroelectric, magnetoresistive, and other storage
media, including non-volatile, flash (e.g., NAND and/or
NOR) storage media.

A. Overview

Many memory systems include a controller- or processor-centric architecture, meaning that a controller or processor
initiates communications between the controller/processor
and one or more memory devices operably connected to the
controller/processor. For example, in many memory systems, a memory controller issues commands to a memory
device over a command/address bus, and the memory device
responds by executing the commands. Thus, the memory
device is mostly responsive to communications it receives
from the memory controller over the command/address bus.
In other words, the command/address bus can be used
primarily by the memory controller to initiate communications with the memory device. Stated another way, the
ability for the memory device to initiate communications
with the memory controller via the command/address bus
can be limited.

In some memory systems, the memory device can communicate with the memory controller, but the communication can be limited. For example, a memory device of some
memory systems can program mode registers to communicate information to the memory controller. The memory
controller can then read the information from the programmed memory registers. To read the programmed mode
registers, however, the memory controller requires all lines
of the command/address bus and/or the data bus to be idle
until the memory controller is able to read the mode registers
and determine how to respond to the communication.
Because the command/address bus and/or the data bus must
be idle for the memory controller to read the mode registers,

MEMORY WITH MEMORY-INITIATED COMMAND INSERTION, AND ASSOCIATED SYSTEMS, DEVICES, AND METHODS

TECHNICAL FIELD

The present disclosure is related to memory systems, devices, and methods. In particular, the present disclosure is related to memory systems with memory-initiated command insertion, and associated systems, devices, and methods.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and non-volatile memory. Volatile memory, including static random access memory (SRAM), dynamic random access memory (DRAM), and synchronous dynamic random access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR) phase change memory (PCM), ferroelectric random access memory (FeRAM), resistive random access memory (RRAM), and magnetic random access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted, but are for explanation and understanding only.

DETAILED DESCRIPTION

As discussed in greater detail below, the technology disclosed herein relates to memory with memory-initiated command insertion, and associated systems, devices, and communication via the mode registers expends a large amount of valuable system bandwidth by tying up these buses.

To address these concerns, memory systems and devices of the present technology can include a command insertion signal trace operably connecting an external command insertion pin of a memory device to (e.g., a memory command scheduler of) a memory controller. When the memory device identifies a condition that can be addressed by a memory device receiving a command from the memory controller, the memory device can transmit the command or an indication of the condition to the memory controller (via the command insertion terminal and the command insertion signal trace) for insertion of the command into a command queue of the memory controller. In turn, the memory controller can issue the command to one or more memory devices of the memory system, such as over the command/address bus and/or the data bus operably connecting the memory controller to the one or more memory devices. In response to receiving the command from the memory controller, a memory device can proceed to execute the command (e.g., to address the identified condition).

Embodiments of the present technology can therefore provide several advantages over other memory systems. For example, memory systems configured in accordance with embodiments of the present technology enable memory devices to initiate communication with the memory controller (e.g., to address conditions that arise at the memory device) rather than waiting for a memory controller to initiate communication and/or recognize the conditions. Furthermore, memory devices in memory systems of the present technology can communicate with the memory controller without significantly affecting system bandwidth over the command/address bus and/or the data DQ bus. For example, memory devices of the present technology can communicate with the memory controller by communicating conditions and/or one or more corresponding commands (e.g., as background operations of the memory device) for insertion of the corresponding command(s) into a command queue of the memory controller in a manner other than programming mode registers and waiting for the memory controller to read the programmed mode registers and determine how to respond. Moreover, by providing memory devices an avenue by which they can communicate with a memory controller, memory systems configured in accordance with the present technology meet industry shifts towards technologies and protocols (e.g., compute express link (CXL), high bandwidth memory third generation (HBM3), DDR6 discovery, etc.) that improve communications between a memory device and a memory controller and/or that are less controller-centric.

Embodiments of the present technology can provide additional advantages over other memory systems, especially with regard to refresh operations. For example, in many memory systems, the total number of memory rows requiring row hammer refresh (RHR) mitigation/servicing at any given time is unknown. Thus, these memory systems use statistical sampling techniques to identify potential victim or hammered memory rows. The statistical sampling techniques, however, often result in more memory rows receiving RHR refreshes than theoretically required. For example, assuming a refresh period of 32 ms, a memory refresh time period or cycle tRFC of 50 ns, and an activation (e.g., hammer) threshold of 2,000 activations before neighboring memory rows require RHR refreshes, the theoretical number of hammered memory rows requiring RHR refreshes is 320 rows (e.g., 32 ms/50 ns/2,000). Yet memory devices that use statistical sampling techniques perform significantly more (e.g., nearly a magnitude greater) RHR refreshes than this theoretical number of hammered memory rows. Performing RHR refreshes on memory rows that do not require RHR mitigation/servicing constitutes a waste of power.

Furthermore, the duration of memory refresh time periods tRFC is a bandwidth limiter. For example, as the duration of a memory refresh time period tRFC increases (e.g., to enable memory devices to perform RHR mitigation/servicing on victim memory rows after the memory device executes a refresh command received from a memory controller), system bandwidth decreases because a memory device is unavailable to the memory controller for access commands until after the memory refresh time period tRFC has elapsed. Moreover, timing margins for performing RHR mitigation/servicing within a memory refresh time period tRFC become tighter as the number of victim memory regions receiving RHR refreshes increases. Utilizing additional memory row parallelism to perform RHR refreshes on a greater number of victim memory regions at the same time can alleviate a declining RHR threshold on future process nodes, but the added parallelism (i) can increase power demanded by the memory device from a power supply, (ii) can cause problems on a power delivery network of the memory device, and/or (iii) can increase the amount of noise injected into peripheral circuits of the memory device.

To address these concerns, memory systems and devices of the present technology can be configured to implement a deterministic solution for RHR operations rather than using statistical sampling techniques to identify potential victim memory regions. In particular, memory systems and devices of the present technology can track a number of times a memory region is activated and use that count to identify aggressor (e.g., seed) and/or victim memory regions. This deterministic solution is expected to decrease the number of memory regions identified for row RHR refreshes in comparison to the number of memory regions identified using statistical sampling techniques. In turn, memory devices are expected to operate with shorter memory refresh time periods tRFC and/or to consume or require less power for RHR operations because fewer memory regions are expected to receive RHR mitigation/servicing. Also, because fewer memory regions are expected to receive RHR refreshes, parallel activations of memory regions (e.g., parallel activations of memory rows) can be reduced during RHR operations. As a result, memory systems and/or devices of the present technology are expected to realize (i) a reduction in power demands on the power supply, (ii) less strain or complications on a power delivery network of the memory device and/or memory system, and/or (iii) less noise injected into peripheral circuits of the memory devices.

Additionally, or alternatively, memory systems and devices configured in accordance with the present technology can perform all or a portion of RHR mitigation/servicing outside of memory refresh time periods tRFC, which can improve system bandwidth and enable looser refresh timing specifications. For example, as discussed in greater detail below, memory systems and devices of the present technology can track a number of activations of a memory region, compare the number of activations to a threshold, determine whether the number of activations meets or exceeds the threshold, and/or identify one or more neighboring (e.g., victim) memory regions within or outside of a memory refresh time period tRFC. When a neighboring memory region is identified, a refresh cycle for that memory region can be inserted into a command queue of a memory controller. In some embodiments, the memory device can insert the refresh cycle into the command queue within or outside of the memory refresh time period tRFC. The memory controller can subsequently issue one or more commands corresponding to the inserted refresh cycle to the memory device to instruct the memory device to refresh the neighboring memory region. Thus, memory devices of the present technology (i) can remove RHR cycles from tRFC budgets, and/or (ii) can perform RHR mitigation/servicing on the neighboring memory region in response to commands received from the memory controller that specifically instruct the memory device to refresh that neighboring memory region.

As a result, a total time required for the memory systems and devices of the present technology to refresh memory regions in response to a refresh command and/or perform RHR mitigation/servicing is expected to be less than the total time required by other memory systems and devices to perform RHR mitigation/servicing (i) after refreshing memory regions in response to receiving a refresh command from a memory controller and (ii) at the end of the corresponding memory refresh time period tRFC. Thus, a duration of memory refresh time periods tRFC for memory systems and devices of the present technology can be less than a duration of memory refresh time periods tRFC for the other memory systems and devices. A reduction in the duration of memory refresh time periods tRFC can translate (i) to an increase in the amount of time the memory devices are available to the memory controller for access operations (which can translate to an increase in system bandwidth), (ii) to looser timing specifications to perform refresh and/or other operations, and/or (iii) to greater command scheduling flexibility.

Figure 1A:
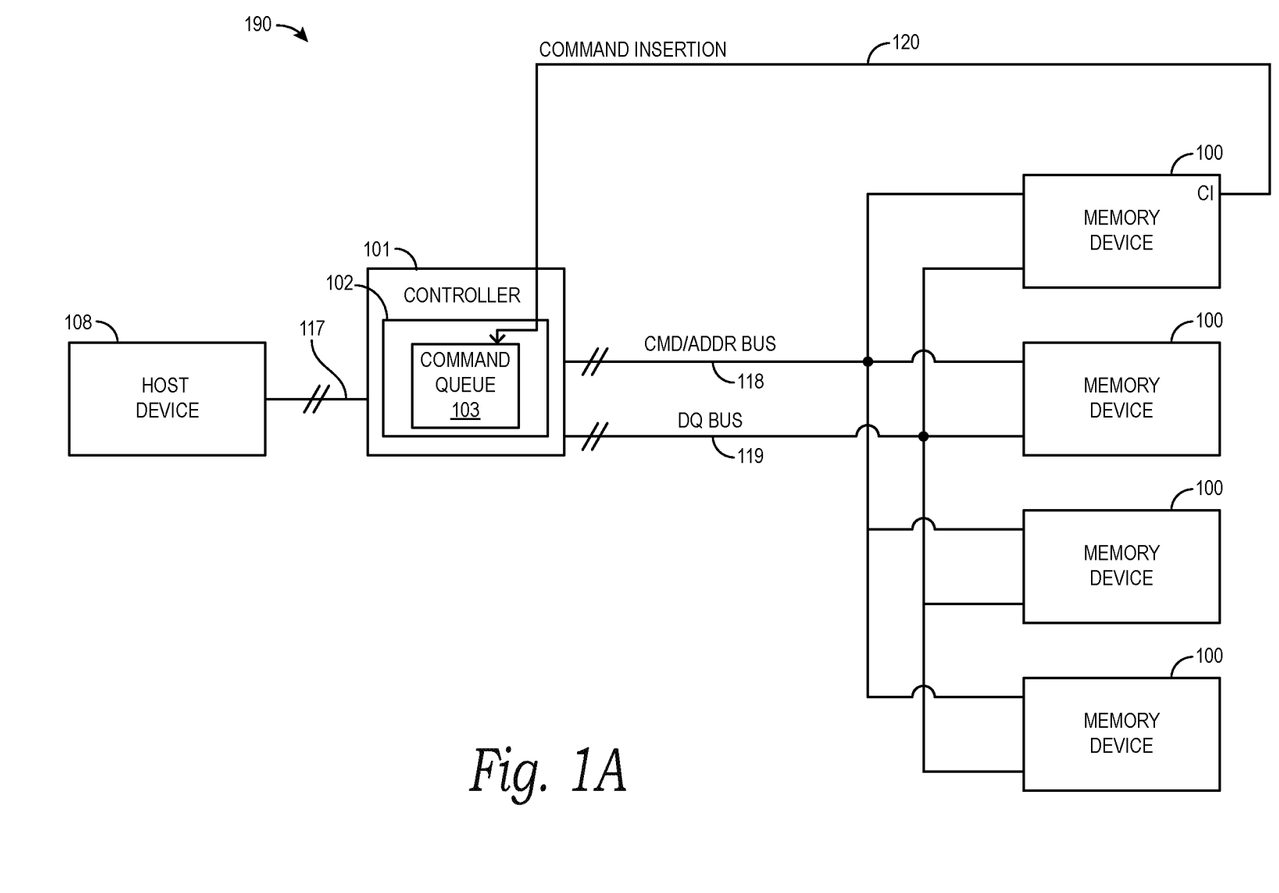
FIG. 1A is a block diagram schematically illustrating a memory system configured in accordance with various embodiments of the present technology.

B. Selected Embodiments of Memory Systems and Associated Devices and Methods FIG. 1A is a block diagram schematically illustrating a memory system 190 configured in accordance with various embodiments of the present technology. In one embodiment, the memory system 190 is a dual in-line memory module (DIMM). In these and other embodiments, a single module or rank of memory devices 100 is illustrated in FIG. 1A. Well-known components of the memory system 190 have been omitted from FIG. 1A and are not described in detail below so as to avoid unnecessarily obscuring aspects of the present technology.

As shown in FIG. 1A, the memory system 190 can include one or more memory devices 100 that can be connected to an electronic device that is capable of utilizing memory for the temporary or persistent storage of information, or a component thereof. For example, the memory devices 100 can be operably connected to a host device 108 and/or to a memory controller 101. The host device 108 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 108 may be a networking device (e.g., a switch, a router, etc.); a recorder of digital images, audio, and/or video; a vehicle; an appliance; a toy; or any one of a number of other products. In one embodiment, the host device 108 may be connected directly to the memory device 100 (e.g., via a communications bus of signal traces (not shown)). Additionally, or alternatively, the host device 108 may be indirectly connected to the memory device 100 (e.g., over a networked connection or through intermediary devices, such as through the memory controller 101 and/or via a communications bus 117 of signal traces).

The memory devices 100 of the memory system 190 are operably connected to the memory controller 101 via a command/address (CMD/ADDR) bus 118 and a data (DQ) bus 119. As described in greater detail below with respect to FIG. 1B, the CMD/ADDR bus 118 and the DQ bus 119 can be used by the memory controller 101 to communicate commands, memory addresses, and/or data to the memory devices 100. In response, the memory devices 100 can execute commands received from the memory controller 101. For example, in the event a write command is received from the memory controller 101 over the CMD/ADDR bus 118, the memory devices 100 can receive data from the memory controller 101 over the data DQ bus 118 and can write the data to memory cells corresponding to memory addresses received from the memory controller 101 over the CMD/ADDR bus 118. As another example, in the event a read command is received from the memory controller 101 over the CMD/ADDR bus 118, the memory devices 100 can output data to the memory controller 101 over the data DQ bus 118 from memory cells corresponding to memory addresses received from the memory controller 101 over the CMD/ADDR bus 118.

In the embodiment illustrated in FIG. 1A, one of the memory devices 100 is further operably connected to the memory controller 101 via one or more command insertion signal traces 120. More specifically, the command insertion signal trace(s) 120 operably connect one or more external command insertion pins or terminals CI of the memory device 100 to a command queue 103 of a memory command scheduler 102 of the memory controller 101. The command insertion signal trace(s) 120 is/are separate and/or different from the CMD/ADDR bus 118 and/or the DQ bus 119. As described in greater detail below, the memory device 100 can communicate conditions and/or commands to the memory controller 101 via the command insertion terminal(s) CI and the command insertion signal trace(s) 120. The commands can then be inserted into the command queue 103 of the scheduler 102. In turn, the memory controller 101 can issue the inserted commands to the one or more memory devices 100 of the memory system 190 via, for example, the CMD/ADDR bus 118, the DQ bus 119, and/or another signaling bus or trace of the memory system 190.

The memory device 100 shown in FIG. 1A operably connected to the memory controller 101 via the command insertion signal trace(s) 120 can be a master memory device 100 of the memory system 190. In some embodiments, only the master memory device 100 of the memory system 190 can communicate conditions and/or corresponding commands to the memory controller 101 directly (e.g., without sending the conditions and/or corresponding commands to the other memory devices 100 of the memory system 190) for insertion of the corresponding commands into the command queue 103 of the scheduler 102 on the memory controller 101. In these and other embodiments, the other memory devices 100 of the memory system 190 can communicate conditions and/or corresponding commands to the master memory device 100. In turn, the master memory device 100 can communicate the conditions and/or corresponding commands directly to the memory controller 101 via the command insertion terminal(s) CI of the master memory device 100 and the corresponding command insertion signal trace(s) 120.

In some embodiments, only the master memory device 100 or only a subset of the memory devices 100 of the memory system 190 include one or more command insertion terminals CI. In other embodiments, each of the memory devices 100 of the memory system 190 can include one or more command insertion terminals CI. Although each of the memory devices 100 of the memory system 190 may include command insertion terminal(s) CI, only the command insertion terminal(s) CI of the master memory device 100 in some embodiments may be operably connected to the memory controller directly (e.g., without an intermediary memory device 100) via the command insertion signal trace(s) 120.

In other embodiments the command insertion terminal(s) CI of more than one (e.g., all or multiple ones) of the memory devices 100 of the memory system 190 can be operably connected to the memory controller 101 directly (e.g., without an intermediary memory device 100) via one or more command insertion signal traces 120. In these embodiments, any of the memory devices 100 operably connected to the memory controller 101 directly via command insertion signal trace(s) 120 can communicate conditions and/or corresponding commands to the memory controller 101 directly (e.g., without sending the conditions and/or corresponding commands to other memory devices 100 of the memory system 190) for insertion of the corresponding commands into the command queue 103 of the scheduler 102. The command insertion signal trace(s) 120 operably connecting the command insertion terminals CI of the memory devices 100 to the memory controller 101 can be common or shared between the memory devices 100. In these and other embodiments, command insertion signal trace(s) 120 can be dedicated to an individual memory device 100.

Figure 1B:
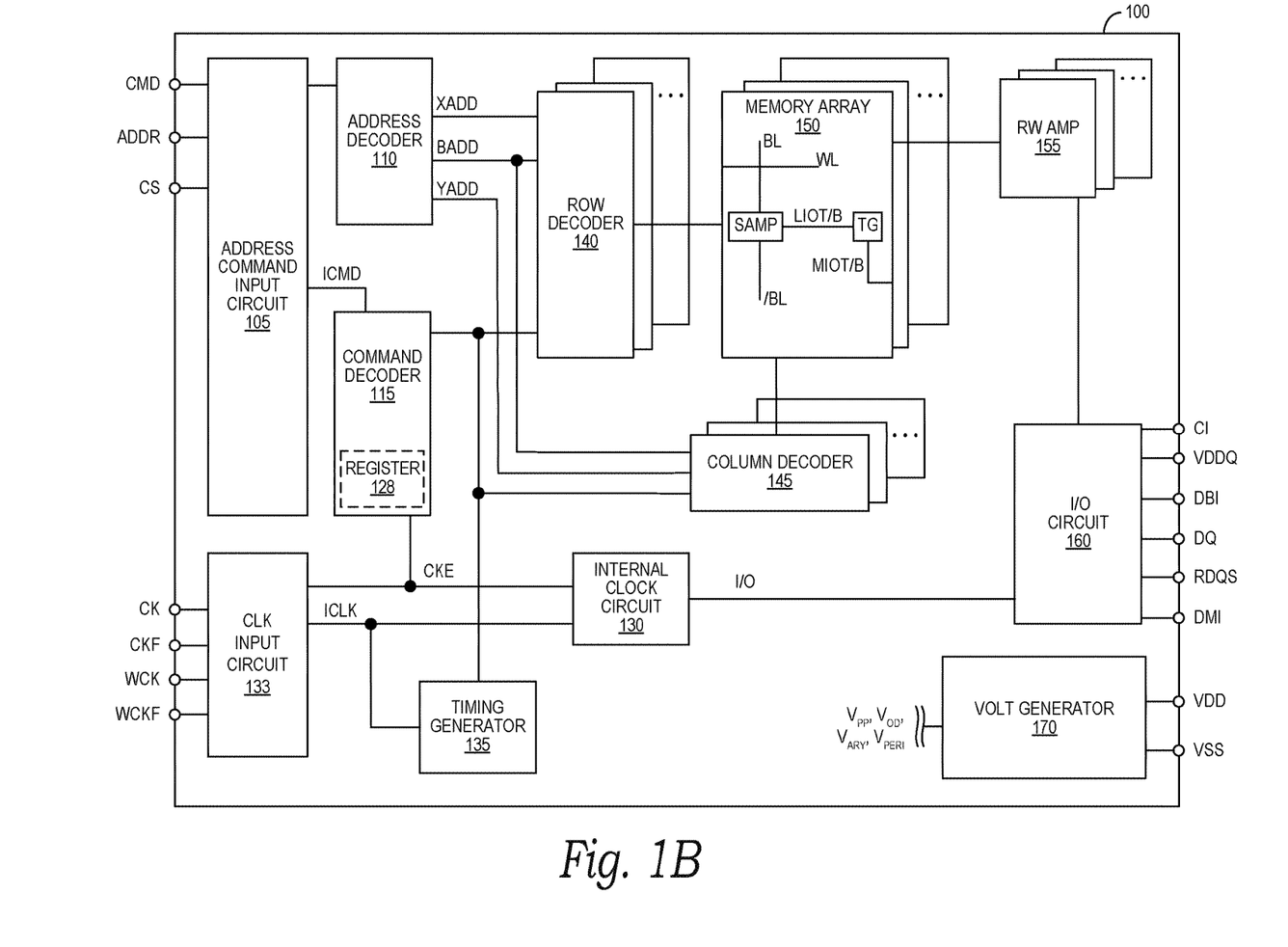
FIG. 1B is a block diagram schematically illustrating a memory device configured in accordance with various embodiments of the present technology.

FIG. 1B is a block diagram of a memory device 100 of FIG. 1A and configured in accordance with various embodiments of the present technology. As shown, the memory device 100 may employ a plurality of external terminals. The external terminals can include command and address terminals operably connected to the CMD/ADDR bus 118 (FIG. 1A) to receive command signals CMD and address signals ADDR, respectively. The external terminals may further include a chip select terminal to receive a chip select signal CS, clock terminals to receive clock signals CK and CKF, data clock terminals to receive data clock signals WCK and WCKF, data terminals DQ, RDQS, DBI, and DMI (e.g., operably connected to the DQ bus 119 of FIG. 1A), and power supply terminals VDD, VSS, and VDDQ.

The memory device 100 can further include one or more command insertion terminals CI configured to be operably connected to (e.g. a memory command scheduler of) a memory controller, for example, via one or more respective command insertion signal traces (e.g., the command insertion signal trace(s) 120 of FIG. 1A). The memory device 100 can include a single command insertion terminal CI in embodiments in which a single command insertion signal trace 120 is used to operably connect the memory device 100 to a memory controller directly. As another example, the memory device 100 can include multiple command insertion terminals CI in embodiments in which multiple command insertion signal traces 120 are used to operably connect the memory device 100 to a memory controller directly. As discussed in greater detail below, when operably connected to the memory controller 101 (FIG. 1A), the memory device 100 can communicate conditions and/or corresponding commands to the memory controller 101 for insertion of the corresponding commands into the command queue 103 (FIG. 1A) of the memory controller 101 such that the memory controller 101 issues the corresponding commands to the memory device 100 and/or another memory device 100 of the memory system 190. The memory controller 101 can issue the corresponding commands over the CMD/ADDR bus 118, the DQ bus 119, and/or another bus or signal trace operably connecting (a) the memory device 100 and/or another memory device 100 of the memory system 190 to (b) the memory controller 101.

Additionally, or alternatively, command insertion terminal(s) CI of the memory device 100 can be configured to be operably connected to command insertion terminal(s) CI of another memory device 100 of the memory system 190. For example, command insertion terminal(s) CI of a first memory device 100 can be operably connected to command insertion terminal(s) CI of a master memory device 100 of the memory system 190. Continuing with this example, one or more other command insertion terminal(s) CI of the master memory device 100 can be operably connected to the memory controller 101 directly. In operation, the first memory device 100 can communicate conditions and/or corresponding commands to the master memory device 100 via the command insertion terminal(s) CI operably connecting the first memory device 100 to the master memory device 100. In turn, the master memory device 100 can communicate the conditions and/or the corresponding commands to the memory controller 101 for insertion of the corresponding commands into the command queue 103 of the memory controller 101.

The power supply terminals of the memory device 100 may be supplied with power supply potentials $V_{DD}$ and $V_{SS}$. These power supply potentials $V_{DD}$ and $V_{SS}$ can be supplied to an internal voltage generator circuit 170. The internal voltage generator circuit 170 can generate various internal potentials $V_{PP}$, $V_{OD}$, $V_{ARY}$, $V_{PERI}$, and the like based on the power supply potentials $V_{DD}$ and $V_{SS}$. The internal potential $V_{PP}$ can be used in a row decoder 140, the internal potentials $V_{OD}$ and $V_{ARY}$ can be used in sense amplifiers included in a memory array 150 of the memory device 100, and the internal potential $V_{PERI}$ can be used in many other circuit blocks.

The power supply terminals may also be supplied with power supply potential $V_{DDQ}$. The power supply potential $V_{DDQ}$ can be supplied to an input/output (I/O) circuit 160 together with the power supply potential $V_{SS}$. The power supply potential $V_{DDQ}$ can be the same potential as the power supply potential $V_{DD}$ in an embodiment of the present technology. The power supply potential $V_{DDQ}$ can be a different potential from the power supply potential $V_{DD}$ in another embodiment of the present technology. However, the dedicated power supply potential $V_{DDQ}$ can be used for the I/O circuit 160 so that power supply noise generated by the I/O circuit 160 does not propagate to the other circuit blocks.

The clock terminals, data clock terminals, and/or the additional clock terminal(s) may be supplied with external clock signals and/or complementary external clock signals. The external clock signals CK, CKF, WCK, and/or WCKF can be supplied to a clock input circuit 133. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 133 can receive the external clock signals. For example, when enabled by a CKE signal from a command decoder 115, an input buffer can receive the CK and CKF signals and/or the WCK and WCKF signals. The clock input circuit 133 can receive the external clock signals to generate internal clock signals ICLK. The internal clock signals ICLK can be supplied to an internal clock circuit 130. The internal clock circuit 130 can provide various phase and frequency controlled internal clock signals based on the received internal clock signals ICLK and a clock enable signal CKE from the command decoder 115. For example, the internal clock circuit 130 can include a clock path (not shown in FIG. 1B) that receives the internal clock signal ICLK and provides various clock signals (not shown) to the command decoder 115. The internal clock circuit 130 can further provide input/output (I/O) clock signals. The I/O clock signals can be supplied to the I/O circuit 160 and can be used as timing signals to, for example, determine an output timing and/or an input timing of data transmitted over the DQ bus 119 (FIG. 1A) and/or conditions/commands transmitted over the command insertion signal trace(s) 120 (FIG. 1A) via the command insertion terminal(s) CI. The I/O clock signals can be provided at multiple clock frequencies so that data can be output from and input into the memory device 100 at different data rates. A higher clock frequency may be desirable when high memory speed is desired. A lower clock frequency may be desirable when lower power consumption and/or looser timing margins are desired. The internal clock signals ICLK can also be supplied to a timing generator 135 and thus various internal clock signals can be generated that can be used by the command decoder 115, the column decoder 145, the I/O circuit 160, and/or other components of the memory device 100.

The memory device 100 may include an array of memory cells, such as memory array 150. The memory cells of the memory array 150 may be arranged in a plurality of memory regions, and each memory region may include a plurality of word lines (WL), a plurality of bit lines (BL), and a plurality of memory cells arranged at intersections of the word lines and the bit lines. In some embodiments, a memory region can be one or more memory banks or another arrangement of memory cells (e.g., half memory banks, subarrays in a memory bank, etc.). In these and other embodiments, the memory regions of the memory array 150 can be arranged in one or more groups (e.g., one or more groups of memory banks, one or more logical memory ranks or dies, etc.). Memory cells in the memory array 150 can include any one of a number of different memory media types, including capacitive, magneto-resistive, ferroelectric, phase change, or the like. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least one respective main I/O line pair (MIOT/B), via transfer gates (TG), which can function as switches. The memory array 150 may also include plate lines and corresponding circuitry for managing their operation.

The command terminals and address terminals may be supplied with an address signal and a bank address signal from outside the memory device 100. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal (BADD) and supply the bank address signal to both the row decoder 140 and the column decoder 145.

The command and address terminals can be supplied with command signals CMD, address signals ADDR, and chip selection signals CS (e.g., from the memory controller 101 and/or the host device 108). The command signals may represent various memory commands (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command (not shown) to the command decoder 115. The command decoder 115 may further include one or more registers 128 for tracking various counts or values, such as a number of times a memory region (e.g., a memory row) has been activated.

When a read command is issued, and a row address and a column address are timely supplied with the read command, read data can be read from memory cells in the memory array 150 designated by these row address and column address. The read command may be received by the command decoder 115, which can provide internal commands to the I/O circuit 160 so that read data can be output from the data terminals DQ, RDQS, DBI, and DMI via read/write (RW) amplifiers 155 and the I/O circuit 160 according to the RDQS clock signals. The read data may be provided at a time defined by read latency information RL that can be programmed in the memory device 100, for example, in a mode register (not shown in FIG. 1B). The read latency information RL can be defined in terms of clock cycles of the CK clock signal. For example, the read latency information RL can be a number of clock cycles of the CK signal after the read command is received by the memory device 100 when the associated read data is provided.

When a write command is issued, and a row address and a column address are timely supplied with the command, write data can be supplied to the data terminals DQ, DBI, and DMI according to the WCK and WCKF clock signals. The write command may be received by the command decoder 115, which can provide internal commands to the I/O circuit 160 so that the write data can be received by data receivers in the I/O circuit 160, and supplied via the I/O circuit 160 and the RW amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in the mode register (not shown in FIG. 1B). The write latency WL information can be defined in terms of clock cycles of the CK clock signal. For example, the write latency information WL can be a number of clock cycles of the CK signal after the write command is received by the memory device 100 when the associated write data is received.

As discussed in greater detail below, the memory device 100 can additionally or alternatively send conditions and/or corresponding commands to the memory controller 101 (FIG. 1A) and/or another memory device 100 of the memory system 190 (FIG. 1A) via the command insertion terminal(s) CI and/or corresponding command insertion signal trace(s) 120 (FIG. 1A). In some embodiments, the memory device 100 can directly transmit a condition and/or corresponding command to the memory controller 101 for insertion of the corresponding command into the command queue 103 of the memory command scheduler 102 of the memory controller. For example, the memory device 100 can insert (e.g., add) the corresponding command directly into the command queue 103. As another example, the memory device 100 can communicate the condition and/or corresponding command to (e.g., the memory command scheduler 102 of) the memory controller 101, and the memory controller 101 (e.g., the memory command scheduler 102) can (i) process the condition (e.g., to identify the corresponding command), (ii) process the corresponding command, and/or (iii) insert (e.g., add) the corresponding command into the command queue 103. In either example, the corresponding command can be inserted into the command queue 103 of the memory controller 101 such that the memory controller 101 issues the corresponding command to the memory device 100 and/or one or more other memory devices 100 of the memory system 190.

In these and other embodiments, the memory device 100 can communicate a condition and/or corresponding command to another memory device 100 of the memory system 190. In turn, the other memory device 100 can (i) receive the condition and/or corresponding command, (ii) process the condition (e.g., to identify the corresponding command), (iii) process the corresponding command, and/or (iv) communicate the condition and/or corresponding command to the memory controller 101 for insertion of the corresponding command into the command queue 103 of the memory controller 101. The corresponding command can be inserted into the command queue 103 such that the memory controller 101 issues the corresponding command to the memory device 100 that communicated the condition and/or corresponding command to the memory controller 101 directly, to the memory device 100 that initially communicated the condition and/or corresponding command, and/or to one or more of the other memory devices 100 of the memory system 190.

In some embodiments, conditions and/or corresponding commands can be communicated over the command insertion terminal(s) CI and/or over corresponding signal trace(s) 120 as background operations of the memory device 100. Thus, in these embodiments, system bandwidth (e.g., on the CMD/ADDR bus 118 (FIG. 1A), on the DQ bus 119 (FIG. 1A), and/or on another bus or signal trace of the memory system 190) can be unaffected or unhindered by communications of conditions and/or corresponding commands over the command insertion terminal(s) CI and/or the corresponding signal trace(s) 120.

Figure 2:
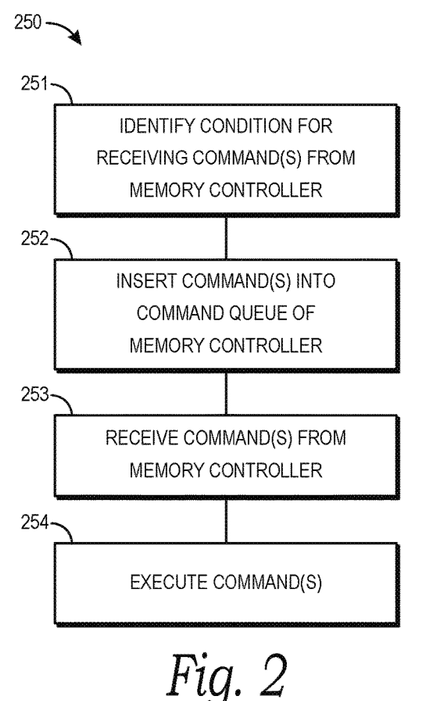
FIG. 2 is a flow diagram illustrating a routine for inserting a command into a command queue of a memory controller in accordance with various embodiments of the present technology.

FIG. 2 is a flow diagram illustrating a routine 250 for inserting a command into a command queue of a memory controller in accordance with various embodiments of the present technology. The routine 250 is illustrated as a set of steps or blocks 251-254. All or a subset of one or more of the blocks 251-254 can be executed by components or devices of a memory system, such as the memory system 190 of FIG. 1A. For example, all or a subset of one or more of the blocks 251-254 can be executed by (i) a memory device (e.g., a memory device 100 of FIGS. 1A and 1B) and/or (ii) a memory controller (e.g., the memory controller 101 of FIG. 1A).

The routine 250 begins at block 251 by a memory device identifying a condition for receiving one or more commands from a memory controller. The memory device can be a master memory device of the memory system. In these and other embodiments, the memory device can be any memory device of the memory system and/or a memory device other than a master memory device of the memory system.

Conditions for receiving commands can include any condition that can be addressed by the memory device receiving a command from the memory controller. For example, a condition for receiving a command from the memory controller can include a condition that arises (e.g., at a memory device) that can be addressed (i) by the memory controller issuing one or more commands (e.g., one or more multi-purpose commands (MPC)) to the memory device and/or (ii) by the memory device executing the one or more commands. In some embodiments, the condition can include (a) the memory device determining a transfer of (e.g., specific) data from the memory device to the memory controller is appropriate, and/or (b) the memory device determining a transfer of (e.g., specific) data from the memory controller to the memory device is appropriate. For example, the memory device can determine that transferring reliability (e.g., error check and scrub (ECS) data), alert-type information, and/or other data to the memory controller is appropriate. In these and other embodiments, the condition can include the memory device determining a training operation between the memory controller and the memory device is appropriate. For example, the memory device can determine that a read delay or a write delay is no longer centering read or write data on the read or write data DQS strobes. This can indicate that various data transfer parameters (e.g., delays on the memory device, delays on the data channels, etc.) have changed since a last time a training operation between the memory controller and the memory device was executed and the data transfer parameters were calibrated. In these and other embodiments, the condition can include the memory device determining an initialization operation is appropriate (e.g., to reset mode registers of the memory device). In these and still other embodiments, the condition can include the memory device determining a refresh (e.g., a row hammer refresh operation, as discussed in greater detail below with respect to FIG. 3) or other operation is appropriate (e.g., to service memory regions of its memory array, reset the memory device, etc.).

At block 252, a memory device communicates the condition and/or one or more corresponding commands to a memory controller for insertion of the corresponding command(s) into a command queue of the memory controller. Communicating the condition and/or corresponding command(s) to the memory controller can include transmitting the condition and/or corresponding command(s) to (e.g., a memory command scheduler of) the memory controller via (i) one or more command insertion terminals of the memory device and/or (ii) one or more corresponding command insertion signal traces operably connecting the command insertion terminals of the memory device to the memory controller. The memory device that communicates the condition and/or corresponding command(s) to the memory controller directly can be the memory device that identified the condition at block 251. In these and other embodiments, the memory device that communicates the condition and/or corresponding command(s) to the memory controller directly can be a master memory device of the memory system. For example, a first memory device can identity the condition at block 251 and can communicate the condition and/or corresponding command(s) to the master memory device (e.g., via one or more signal traces operably connecting the first memory device to the master memory device). Based at least in part on receiving the condition and/or the corresponding command(s) from the first memory device, the master memory device can (i) process the condition (e.g., to identify the corresponding command(s), (ii) process the corresponding command(s) and/or (iii) transmit the condition and/or corresponding command(s) to the memory controller for insertion into the command queue of the memory controller.

In the event the condition identified at block 251 is a memory device determining that a transfer of (e.g., specific) data from the memory device to the memory controller is appropriate, that memory device and/or another memory device can communicate the condition and/or one or more corresponding commands (e.g., a read command and/or another appropriate command) to the memory controller at block 252 for insertion of the corresponding command(s) into the command queue of the memory controller. The communication of the condition and/or the corresponding command(s) can specify or indicate (e.g., via an identifier of a memory device) from which memory device data is to be transferred to the memory controller such that the memory controller can indicate the corresponding command(s) is/are intended for that memory device when the memory controller issues the corresponding command(s).

Similarly, in the event the condition identified at block 251 is a memory device determining that a transfer of (e.g., specific) data from the memory controller to the memory device is appropriate, that memory device and/or another memory device can communicate the condition and/or one or more corresponding commands (e.g., a write command and/or another appropriate command) to the memory controller at block 252 for insertion of the corresponding command(s) into the command queue of the memory controller. The communication of the condition and/or the corresponding command(s) can specify or indicate (e.g., via an identifier of a memory device) to which memory device data is to be transferred from the memory controller such that the memory controller can indicate the corresponding command(s) and requested data are intended for that memory device when the memory controller issues the corresponding command(s) and/or transmits the requested data.

In the event the condition identified at block 251 is a memory device determining that a training and/or initialization operation is appropriate, that memory device and/or another memory device can communicate the condition and/or one or more corresponding command(s) to the memory controller at block 252 for insertion of the corresponding command(s) into the command queue of the memory controller. In some embodiments, the corresponding command(s) can include a mode register set (MRS) command, a ZQ calibration command, a $V_{ref}$DQ calibration command, a read training command, and/or a write training command. The communication of the condition and/or the corresponding command(s) can specify which memory device is requesting the training and/or initialization such that the memory controller can indicate the corresponding command(s) is/are intended for that memory device when the memory controller issues the corresponding command(s).

In the event the condition identified at block 251 is a memory device determining that a refresh operation (e.g., a row hammer refresh operation) is appropriate, that memory device and/or another memory device can communicate the condition and/or one or more corresponding command(s) (e.g., one or more refresh commands and/or cycles, such as an activate command together with a precharge command) to the memory controller at block 252 for insertion of the corresponding command(s) into the command queue of the memory controller. The communication of the condition and/or the corresponding command(s) (i) can specify which memory device is to execute the refresh operation and/or (ii) can specify one or more addresses of one or more memory regions to be refreshed. In turn, when the memory controller issues the corresponding command(s), the memory controller can instruct (a) the memory device that identified the condition at block 251, (b) the memory device that communicated the condition and/or the corresponding command(s) to the memory controller at block 252, and/or (c) another memory device of the memory system to refresh memory regions, such as memory regions corresponding to the memory address(es) specified in the communication from the memory device to the controller at block 252. Refresh operations are discussed in greater detail below with respect to FIG. 3.

In some embodiments, a memory device can insert one or more commands corresponding to a condition identified at block 251 directly into a command queue of the memory controller. In these and other embodiments, a memory device can communicate a condition and/or one or more corresponding commands to (e.g., a memory command scheduler of) the memory controller. In turn, the memory controller can (i) process the condition received from the memory device (e.g., to identify the one or more corresponding commands), (ii) process the one or more corresponding commands received from the memory device, and/or (iii) insert the one or more corresponding commands into its command queue.

In some embodiments, the corresponding command(s) can be inserted into any position in the command queue of the memory controller. For example, a corresponding command can be inserted at an end of the command queue such that the corresponding command is issued by the memory controller in turn. As another example, a corresponding command can be inserted at afront of the command queue such that the corresponding command is the next command issued by the memory controller. As still another example, a corresponding command can be inserted at any position between the front and the end of the command queue.

At block 253, a memory device receives the corresponding command(s) from the memory controller. The memory device that receives the corresponding command(s) at block 253 can be the memory device that identified the condition at block 251. In these and other embodiments, the memory device that receives the corresponding command(s) at block 253 can be the memory device that communicated the condition and/or the corresponding command(s) directly to the memory controller at block 252 for insertion of the corresponding command(s) into the command queue of the memory controller. In these and still other embodiments, the memory device that receives the corresponding command(s) at block 253 can be any of the memory devices of the memory system.

In some embodiments, the memory device receives the corresponding command(s) in a same or similar manner as the memory device would receive the command(s) had the command(s) been initiated by the memory controller or a host device (as opposed to by a memory device). For example, when the memory controller issues the corresponding command(s) that were inserted into its command queue at block 252, the memory controller can issue the corresponding command(s) over the command/address CMD/ADDR bus, the data DQ bus, and/or another bus or signal trace operably connecting the memory controller to the memory device in a same or similar manner as to how the memory controller would issue the same or similar command(s) had the command been inserted into its command queue at the direction of the memory controller and/or at the direction of a host device (as opposed to at the direction of a memory device).

At block 254, a memory device executes the corresponding command(s) received from the memory controller at block 253. In some embodiments, the memory device can be the memory device that identified the condition at block 251. In these and other embodiments, the memory device can be the memory device that communicated the condition and/or the corresponding command(s) directly to the memory controller at block 252. In these and still other embodiments, the memory device can be any of the memory devices of the memory system, such as a memory device identified by the memory controller when the memory controller issues one of the corresponding commands. For example, the memory controller can issue a memory device (e.g., chip) select signal with a corresponding command. The memory device select signal can indicate which of the memory devices is to execute the corresponding command. Thus, the memory device that executes the command at block 254 can be a memory device that corresponds to the memory device select signal issued by the memory controller. In some embodiments, the memory device executes the corresponding command(s) at block 254 in a same or similar manner that the memory device would execute the command(s) had the command(s)been initiated by the memory controller or a host device (as opposed to by a memory device).

Although the blocks 251-254 of the routine 250 are discussed and illustrated in a particular order, the routine 250 illustrated in FIG. 2 is not so limited. In other embodiments, the routine 250 can be performed in a different order. In these and other embodiments, any of the blocks 251-254 of the routine 250 can be performed before, during, and/or after any of the other blocks 251-254 of the routine 250. Moreover, a person of ordinary skill in the relevant art will recognize that the illustrated routine 250 can be altered and still remain within these and other embodiments of the present technology. For example, one or more blocks 251-254 of the routine 250 illustrated in FIG. 2 can be omitted and/or repeated in some embodiments.

Embodiments of the present technology can therefore provide several advantages over other memory systems. For example, memory systems configured in accordance with embodiments of the present technology enable memory devices to initiate communication with the memory controller (e.g., to address conditions that arise at the memory device) rather than waiting for a memory controller to initiate communication and/or recognize the conditions. Furthermore, memory devices in memory systems of the present technology can communicate with the memory controller without significantly affecting system bandwidth over the command/address bus and/or the data DQ bus. For example, memory devices of the present technology can communicate with the memory controller by communicating conditions and/or one or more corresponding commands (e.g., as background operations of the memory devices) for insertion of the corresponding commands into a command queue of the memory controller in a manner other than programming mode registers and waiting for the memory controller to read the programmed mode registers and determine how to respond. The present technology also offers several additional bandwidth, timing, and power reduction benefits, as discussed in greater detail below with respect to FIG. 3.

FIG. 3 is a flow diagram illustrating a routine 360 for inserting refresh operations and/or cycles into a command queue of a memory controller in accordance with various embodiments of the present technology. The routine 360 is illustrated as a set of steps or blocks 361-367. All or a subset of one or more of the blocks 361-367 can be executed by components or devices of a memory system, such as the memory system 190 of FIG. 1A. For example, all or a subset of one or more of the blocks 361-367 can be executed by (i) a memory device (e.g., a memory device 100 of FIGS. 1A and 1B) and/or (ii) a memory controller (e.g., the memory controller 101 of FIG. 1A).

FIG. 3 is primarily discussed in detail below in the context of refresh operations (e.g., row hammer refresh operations) to highlight several advantages provided by memory systems configured in accordance with the present technology. At least a portion of the routine 360 can be considered an application of the routine 250 of FIG. 2. Therefore, the discussion of any one or more of the blocks 251-254 of the routine 250 of FIG. 2 can apply in whole or in part to the discussion below regarding any one or more of the blocks 361-367 of the routine 360 of FIG. 3.

The routine 360 begins at block 361 by a memory device tracking a number of times a memory region of the memory device is activated. In some embodiments, the memory region can be a memory row of the memory device. In these and other embodiments, the memory device can track a number of times all or a subset of the memory regions of its memory array are activated. For example, the memory device can store a count or value for each memory region (e.g., each memory row) of the memory device. Each count can represent the number of times a corresponding memory region of the memory device has been activated. Therefore, the memory device can increase a count (e.g., by one) each time the memory region corresponding to the count is activated.

At block 362, the memory device can compare the number of times the memory region of the memory device has been activated to a threshold. In some embodiments, the threshold can be any number, and/or the threshold can be predetermined and/or preset. For example, the threshold can be set equal to a value (e.g., 2,000; 10,000; or other threshold value) that represents a number of activations of the memory region at or below which activations of the (e.g., aggressor) memory region are not expected to significantly affect (e.g., data retention of) neighboring (e.g., victim or hammered) memory regions. Stated another way, the threshold can be set equal to a value that represents a number of activations of the memory region at or above which activations of the (e.g., aggressor) memory region are expected to significantly affect (e.g., data retention of) neighboring (e.g., victim) memory regions. Thus, when the number of times the memory region of the memory device has been activated meets or exceeds the threshold, the memory device can determine that neighboring memory regions may require row hammer refresh (RHR) operations and/or other operations to service the neighboring memory regions and thereby mitigate or alleviate the effects of activating the memory region a number of times equal to or greater than the threshold.

At block 363, the memory device can determine whether the number of times the memory region of the memory device has been activated meets or exceeds the threshold. If the memory device determines that the number of times the memory region of the memory device has been activated does not meet or exceed the threshold, the routine 360 can return to block 361 or block 362. On the other hand, if the memory device determines that the number of times the memory region of the memory device has been activated meets or exceeds the threshold, the routine 360 can proceed to block 364.

At block 364, the memory device identifies one or more memory regions that neighbor the memory region corresponding to the activation count. For example, in embodiments in which the memory region is a memory row, the neighboring memory regions can include one or more memory rows that are proximate (e.g., adjacent, immediately adjacent, within a certain number of memory rows from, etc.) the memory region in the memory array of the memory device. Identifying the one or more neighboring memory regions can include identifying the memory addresses corresponding to the one or more neighboring memory regions.

At block 365, the routine 360 continues by the memory device communicating (i) the condition that a neighboring memory region requires one or more refresh cycles (e.g., RHR mitigation/servicing) and/or (ii) one or more commands corresponding to the refresh cycle(s). The memory device can communication the condition and/or the one or more corresponding commands to a memory controller operably connected to the memory device for insertion of the corresponding command(s) into a command queue of the memory controller. The one or more commands corresponding to a refresh cycle can include an activate (ACT) command, a precharge (PRE) command, and/or one or more other commands. For example, execution of an activation operation and a precharge operation on a memory region can together define a refresh cycle of the memory region. Continuing with this example, commands corresponding to a refresh cycle can therefore include (i) an activation command and a precharge command, and/or (ii) an activation-precharge (e.g., combination) command.

In some embodiments, the memory device can additionally communicate (to the memory controller) a memory address corresponding to the neighboring memory region at block 365. Communicating the memory address of the neighboring memory region can enable the memory controller to instruct the memory device to perform a refresh cycle on that specific neighboring memory region when the memory controller issues the one or more corresponding commands that have been inserted into the command queue.

The memory device can communicate the condition, the corresponding command(s), and/or the memory address of the neighboring memory region to the memory controller in a manner consistent with the discussion above regarding block 252 of the routine 250 of FIG. 2. In some embodiments, the memory device can communicate the condition, the corresponding command(s), and/or the memory address to the memory controller via (i) a command insertion terminal CI of the memory device and (ii) a corresponding command insertion signal trace operably connecting the command insertion terminal CI of the memory device to the command queue of the memory controller. In these and other embodiments, the memory device can communicate the condition, the corresponding command(s), and/or the memory address of the neighboring memory region to another memory device (e.g., a master memory device) of the memory system. In turn, the other memory device can transmit the condition, the corresponding command(s), and/or the memory address of the neighboring memory region to the memory controller for insertion of the corresponding command(s) into the command queue of the memory controller.

In some embodiments, the number of refresh cycles communicated to the memory controller and/or the number of corresponding commands inserted into the command queue can correspond to the number of neighboring memory regions identified at block 364. For example, a refresh cycle and/or corresponding command(s) can be communicated to the memory controller and/or inserted into the command queue for each neighboring memory region identified at block 364.

At block 366, the memory device receives commands from the memory controller corresponding to a refresh cycle inserted into the command queue of the memory controller at block 365. For example, the memory device can receive an ACT command, a PRE command, and/or a memory address corresponding to a neighboring memory region identified at block 364. Continuing with this example, the memory device can receive the ACT command, the PRE command, and/or the memory address of the corresponding neighboring memory region via a command/address bus operably connecting the memory device to the memory controller. The memory device can receive the ACT command, the PRE command, and/or the memory address from the memory controller in a same or similar manner to how the memory device would receive the ACT command, the PRE command, and/or the memory address from the memory controller had the refresh cycle been initiated by the memory controller or by a host device (as opposed to by the memory device). In some embodiments, the memory device can receive the commands from the memory controller in a manner consistent with the discussion above regarding block 253 of the routine 250 of FIG. 2.

At block 367, the routine 360 continues by the memory device executing the corresponding command(s) received from the memory controller at block 366. In some embodiments, the memory device can execute the corresponding command(s) in a manner consistent with the discussion above regarding block 254 of the routine 250 of FIG. 2. For example, in response to receiving an ACT command and/or a memory address corresponding to a neighboring memory region from the memory controller, the memory device can activate the neighboring memory region. Continuing with this example, in response to receiving a PRE command and/or the memory address corresponding to the neighboring memory region from the memory controller, the memory device can precharge the neighboring memory region. Activating and precharging the neighboring memory region can service the neighboring memory region to mitigate and/or alleviate the effects of activating the memory region of blocks 361-363 a number of times that meets or exceeds the threshold of blocks 362 and 363 (e.g., similar to row hammer refresh operations). In some embodiments, after executing the refresh cycle(s) on the neighboring memory region(s), the memory device can reset a count or value corresponding to a number of times the memory region of blocks 361-363 has been activated.

Although the blocks 361-367 of the routine 360 are discussed and illustrated in a particular order, the routine 360 illustrated in FIG. 3 is not so limited. In other embodiments, the routine 360 can be performed in a different order. In these and other embodiments, any of the blocks 361-367 of the routine 360 can be performed before, during, and/or after any of the other blocks 361-367 of the routine 360. Moreover, a person of ordinary skill in the relevant art will recognize that the illustrated routine 360 can be altered and still remain within these and other embodiments of the present technology. For example, one or more blocks 361-367 of the routine 360 illustrated in FIG. 3 can be omitted and/or repeated in some embodiments.

Embodiments of the present technology can therefore provide several advantages over other memory systems. For example, rather than using statistical sampling techniques to identify potential victim memory regions for row hammer refresh operations, memory systems configured in accordance with embodiments of the present technology can implement a deterministic solution for RHR operations. In particular, memory systems of the present technology can track a number of times a memory region is activated and use that count to identify aggressor (e.g., seed) and/or victim memory regions. This deterministic solution is expected to decrease the number of memory regions identified for RHR mitigation/servicing in comparison to the number of memory regions identified using statistical sampling techniques. In turn, memory devices are expected to consume or require less power for RHR operations because fewer memory regions are expected to receive RHR mitigation/servicing. Also, because fewer memory regions are expected to receive RHR mitigation/servicing, parallel activations of memory regions (e.g., parallel activations of memory rows) can be reduced during RHR operations. As a result, memory systems and/or devices of the present technology are expected to realize (i) a reduction in power demands on the power supply, (ii) less strain or complications on a power delivery network of the memory device and/or memory system, and/or (iii) less noise injected into peripheral circuits of the memory devices.

Additionally, or alternatively, memory systems and devices configured in accordance with the present technology can perform all or a portion of RHR mitigation/servicing outside of memory refresh time periods or cycles tRFC, which can improve system bandwidth and enable looser refresh timing specifications. For example, as discussed above, many memory systems are configured to perform RHR mitigation/servicing (i) after refreshing memory regions in response to receiving a refresh command and (ii) at an end of the corresponding memory refresh time period tRFC. Thus, these memory systems require relatively long memory refresh time periods tRFC to ensure adequate timing margins for performing RHR operations after executing the refresh command. System bandwidth decreases as the length of memory refresh time periods tRFC increases because the memory devices are unavailable to the memory controller for access operations for the duration of memory refresh time periods tRFC.

In contrast, memory systems and devices of the present technology can perform all or a portion of RHR mitigation/servicing outside of the memory refresh time periods tRFC. For example, memory systems and devices of the present technology can perform all or a portion of the routine 360 of FIG. 3 outside of a memory refresh time period tRFC. More specifically, memory systems and devices can perform blocks 366 and 367 outside of a memory refresh time periods tRFC by performing RHR mitigation/servicing in response to commands (e.g., activate and/or precharge commands) received from the memory controller that instruct a memory device to specifically refresh a memory region that was identified as a victim memory region. In these and other embodiments, memory systems and devices of the present technology can track a number of activations of a memory region (block 361), compare the number of activations to a threshold (block 362), determine whether the number of activations meets or exceeds the threshold (block 363), identify one or more neighboring memory regions (block 364), and/or insert refresh cycles for the one or more neighboring memory regions into a command queue of a memory controller (block 365) within memory refresh time periods tRFC.

As a result, a total time required for the memory systems and devices of the present technology to refresh memory regions in response to a refresh command and/or perform one or more of blocks 361-365 of the routine 360 of FIG. 3 is expected to be less than the total time required by other memory systems and devices to perform RHR mitigation/servicing (i) after refreshing memory regions in response to receiving a refresh command and (ii) at the end the corresponding memory refresh time period tRFC. Thus, a duration of memory refresh time periods tRFC for memory systems and devices of the present technology can be less than a duration of memory refresh time periods tRFC for the other memory systems and devices. A reduction in the duration of memory refresh time periods tRFC can translate to (i) an increase in the amount of time the memory devices are available to the memory controller (which can translate to an increase in system bandwidth), (ii) looser timing specifications to perform refresh and/or other operations, and/or (iii) greater command scheduling flexibility.

Any of the foregoing memory systems, devices, and/or methods described above with reference to FIGS. 1A-3 can be incorporated into any of a myriad of larger and/or more complex systems, a representative example of which is system 490 shown schematically in FIG. 4. The system 490 can include a semiconductor device assembly 400, a power source 492, a driver 494, a processor 496, and/or other subsystems and components 498. The semiconductor device assembly 400 can include features generally similar to those of the memory systems, devices, and/or methods described above with reference to FIGS. 1A-3. The resulting system 490 can perform any of a wide variety of functions, such as memory storage, data processing, and/or other suitable functions. Accordingly, representative systems 490 can include, without limitation, hand-held devices (e.g., mobile phones, tablets, digital readers, and digital audio players), computers, vehicles, appliances, and other products. Components of the system 490 may be housed in a single unit or distributed over multiple, interconnected units (e.g., through a communications network). The components of the system 490 can also include remote devices and any of a wide variety of computer readable media.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize.

For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms can also include the plural or singular term, respectively. Furthermore, as used herein, the phrase "and/or" as in "A and/or B" refers to A alone, B alone, and both A and B. Additionally, the terms "comprising," "including," "having" and "with" are used throughout to mean including at least the recited feature(s) such that any greater number of the same feature and/or additional types of other features are not precluded.

From the foregoing, it will also be appreciated that various modifications can be made without deviating from the technology. For example, various components of the technology can be further divided into subcomponents, or that various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A memory chip, comprising:
an array of memory cells; and
a command insertion terminal configured to be operably connected to a memory controller different from the memory chip,
wherein the memory chip is configured to:
identify a condition that can be addressed by receiving a command from the memory controller, wherein the condition includes (i) the memory chip determining the memory chip requires training or (ii) the memory chip determining the memory chip requires initialization,
initiate a communication with the memory controller such that the command is inserted into a command queue of the memory controller at the direction of the memory chip, wherein initiating the communication with the memory controller includes outputting, via the command insertion terminal, the command or an indication of the condition,
receive the command from the memory controller, and address the condition, wherein addressing the condition includes executing the command.

2. The memory chip of claim 1, wherein:
the memory chip further comprises a command terminal; and
the memory chip is further configured to receive the command from the memory controller via the command terminal after outputting the command or the indication of the condition via the command insertion terminal.

3. The memory chip of claim 1, wherein:
the command insertion terminal is a first command insertion terminal; and
the memory chip further comprises a second command insertion terminal configured to be operably connected to another memory chip different from the memory controller.

4. The memory chip of claim 1, wherein the condition includes the memory chip determining a memory region of the memory chip requires refreshing.

5. The memory chip of claim 4, wherein the memory chip is further configured to output, via the command insertion terminal, a memory address of the memory region such that the memory chip performs a refresh cycle or a refresh operation on the memory region in response to receiving the command from the memory controller.

6. The memory chip of claim 1, wherein the memory chip is further configured to output, via the command insertion terminal, an identifier of the memory chip such that the command in the command queue is issued with a chip select signal that targets the memory chip based on the identifier.

7. The memory chip of claim 1, wherein the memory chip is further configured to:
store a value representing a number of times a first memory region of the memory chip is activated;
determine that the value meets or exceeds a threshold;
identify a memory address of a second memory region of the memory chip, wherein the second memory region neighbors the first memory region in the array of memory cells; and
perform a refresh cycle or a refresh operation on the second memory region in response to receiving the command from the memory controller.

8. The memory chip of claim 1, wherein the condition includes the memory chip determining to output data from DQ data terminals of the memory chip to the memory controller.

9. The memory chip of claim 1, wherein the condition includes the memory chip determining to receive specific data from the memory controller.

10. The memory chip of claim 1, wherein the condition includes the memory chip determining to output error check and scrub data from the memory chip to the memory controller.

11. The memory chip of claim 1, wherein the memory chip is an individual dynamic random access memory (DRAM) die.

12. A method of operating a memory chip including an array of memory cells, the method comprising:
identifying a condition that can be addressed by receiving a command from a memory controller different from the memory chip;
initiating a communication with the memory controller such that the command is inserted into a command queue of the memory controller at the direction of the memory chip, wherein initiating the communication with the memory controller includes outputting, via a command insertion terminal of the memory chip, the command or an indication of the condition to the memory controller;
inserting the command directly into the command queue of the memory controller, wherein inserting the command directly into the command queue of the memory controller includes (i) inserting the command at a front of the command queue such that the command is a next command issued by the memory controller or (b) inserting the command at a position between the front or an end of the command queue;

receiving the command from the memory controller; and addressing the condition, wherein addressing the condition includes executing the command received from the memory controller.

13. The method of claim 12, further comprising:

storing a value representing a number of times a first memory region of the memory chip is activated;

determining that the value meets or exceeds a threshold; and identifying a memory address of a second memory region of the memory chip, wherein:
  the second memory region neighbors the first memory region in the array of the memory cells,
  the condition is the second memory region requiring a refresh cycle or a refresh operation, and
  the method further comprises:
    receiving the command from the memory controller after outputting the command or the indication of the condition, and
    in response to receiving the command from the memory controller refreshing the second memory region.

14. A memory system, comprising:

a memory controller having a memory command scheduler configured to generate a command queue;

a first memory chip different from the memory controller and having (i) a first array of memory cells and (ii) a first command insertion terminal;

a first command insertion signal trace operably connecting the first command insertion terminal of the first memory chip to the memory command scheduler of the memory controller;

a second memory chip different form the first memory chip and the memory controller, the second memory chip having (i) a second array of memory cells and (ii) a second command insertion terminal different from the first command insertion terminal; and a second command insertion signal trace operably connecting the second command insertion terminal of the second memory chip to the memory command scheduler of the memory controller, wherein the first memory chip is configured to:
  identify a first condition that can be addressed by receiving a first command from the memory controller,
  initiate a first communication with the memory controller such that the first command is inserted into the command queue at the direction of the first memory chip, wherein initiating the first communication with the memory controller includes outputting, via the first command insertion terminal and the first command insertion signal trace, the first command or an indication of the first condition to the memory command scheduler,
  receive the first command from the memory controller, and
  address the first condition, wherein addressing the first condition includes executing the first command; and wherein the second memory chip is configured to:
  identify a second condition that can be addressed by receiving a second command from the memory controller, wherein the second condition is different from the first condition, and wherein the second command is different from the first command,
  initiate a second communication with the memory controller such that the second command is inserted into the command queue at the direction of the second memory chip, wherein initiating the second communication with the memory controller includes outputting, via the second command insertion terminal and the second command insertion signal trace, the second command or an indication of the second condition to the memory command scheduler,
  receive the second command from the memory controller, and
  address the second condition, wherein addressing the second condition includes executing the second command.

15. The memory system of claim 14, wherein the first command insertion terminal of the first memory chip is operably connected directly to the command queue of the memory controller via the first command insertion signal trace such that the first command, when output via the first command insertion terminal, is added directly into the command queue.

16. The memory system of claim 14, wherein:

the first array includes a first memory region and a second memory region neighboring the first memory region; and the first memory chip is further configured to:
  store a value representing a number of times the first memory region is activated,
  determine that the value meets or exceeds a threshold,
  identify a memory address of the second memory region,
  receive the first command from the memory controller after the first command is inserted into the command queue, and
  execute the first command to refresh the second memory region in response to receiving the first command from the memory controller.

17. The memory system of claim 14, wherein:

the first memory chip includes a third command insertion terminal different from the first and second command insertion terminals;

the second command insertion signal trace operably connects the second command insertion terminal of the second memory chip to the memory command scheduler of the memory controller via the third command insertion terminal of the first memory chip;

initiating the second communication with the memory controller includes outputting, via the second command insertion terminal and the second command insertion signal trace, the second command or an indication of the second condition to the first memory chip; and the first memory chip is further configured to output, via the first command insertion terminal and the first command insertion signal trace, the second command or the indication of the second command to the memory command scheduler.

\* \* \* \* \*